United States Patent [19]

Hayakawa et al.

[11] Patent Number: 4,971,185
[45] Date of Patent: Nov. 20, 1990

[54] OIL CHANNEL STRUCTURE FOR AUTOMATIC TRANSMISSION

[75] Inventors: Youichi Hayakawa, Toyoake; Ryoichi Shirai, Okazaki, both of Japan

[73] Assignee: Aisin AW Co. Ltd., Aichi, Japan

[21] Appl. No.: 293,250

[22] Filed: Jan. 4, 1989

[30] Foreign Application Priority Data

Aug. 11, 1988 [JP] Japan ................................. 63-201400

[51] Int. Cl.$^5$ ............................................... F16D 19/00
[52] U.S. Cl. .............................. 192/85 R; 192/85 AA; 74/606 R
[58] Field of Search ............... 192/85 AA, 85 R, 87.1, 192/87.11, 85 A; 74/606 R, 740

[56] References Cited

U.S. PATENT DOCUMENTS 4,607,541  8/1986  Miura et al. ....................... 74/740 X
4,716,787  1/1988  Miura et al. ................. 192/87.11 X

FOREIGN PATENT DOCUMENTS

62-141342  6/1987  Japan .

Primary Examiner—Randolph A. Reese
Assistant Examiner—Franco S. DeLiguori
Attorney, Agent, or Firm—Kanesaka and Takeuchi

[57] ABSTRACT

A plurality of oil channels formed in a casing is communicated with a single rotating hydraulic actuator. The casing comprises a transaxle casing on which a valve body is disposed, and a rear cover is fixed to the transaxle casing. The oil channels extend outwardly from a boss section in the casing and are radially arranged in a single plane of the rear cover. Oil from the hydraulic actuator is instantly exhausted through oil holes of an inner drum, an annular indented groove of the boss section, indented portions of sector shape and the oil channels.

5 Claims, 6 Drawing Sheets

| | | FIRST AUTOMATIC TRANSMISSION MECHANISM 13 | | | | | | | SECOND AUTOMATIC TRANSMISSION MECHANISM 27 | | |
|---|---|---|---|---|---|---|---|---|---|---|---|
| | | C1 | C2 | B1 | B2 | B3 | F1 | F2 | C3 | B4 | F3 |
| | P | | | | | | | | | ○ | |
| | R | | ○ | | | ○ | | | | ○ | |
| | N | | | | | | | | | ○ | |
| D | 1 | ○ | | | | | | ○ | | ○ | ○ |
| | 2 | ○ | | (○) | ○ | | ○ | | | ○ | ○ |
| | 3 | ○ | | (○) | ○ | | ○ | | ○ | | |
| | 4 | ○ | ○ | | ○ | | | | ○ | | |
| 3 | 1 | ○ | | | | | | ○ | | ○ | ○ |
| | 2 | ○ | | ○ | ○ | | ○ | | | ○ | ○ |
| | 3 | ○ | | ○ | ○ | | ○ | | ○ | | |
| 2 | 1 | ○ | | | | | | ○ | | ○ | ○ |
| | 2 | ○ | | ○ | ○ | | ○ | | | ○ | ○ |
| 1 | 1 | ○ | | | | ○ | | ○ | | ○ | ○ |
| | 2 | ○ | | ○ | ○ | | ○ | | | ○ | ○ |

FIG.6

OIL CHANNEL STRUCTURE FOR AUTOMATIC TRANSMISSION

BACKGROUND OF THE INVENTION

1. Field of the Invention

The present invention relates to an oil channel structure for an automatic transmission, specifically an oil channel structure for supplying operating oil to a hydraulic actuator for forward clutch or exhausting oil from the hydraulic actuator, the oil channel structure being formed in a casing.

2. Description of the Prior Art

Recently, the present applicant proposed an automatic transmission wherein a plurality of clutches are provided to connect a certain rotating element of a planetary gear unit to an input shaft, and arranged in a unit in a rear casing of the automatic transmission end section.

The automatic transmission has an inner drum slidably connected to the input shaft in a boss section formed in the rear casing, and an outer drum is secured to the inner drum to form a clutch drum. A first movable member is fitted into the clutch drum to form a hydraulic actuator for operating the first clutch (forward clutch), and a second movable member is fitted into the first movable member to form a hydraulic actuator for operating the second clutch (reverse and direct clutch).

Hydraulic presure from the valve body is sent to a sector (arcuate) shaped indented section and annular indented groove through an oil channel formed in the rear cover, and supplied to each hydraulic actuator through an oil hole formed in the inner drum slidably connected to the boss section.

However, more than one oil channel and sector shaped indented section can not be made in each hydraulic actuator. The flow resistance of the oil channel per se is large and becomes an orifice, and the sector shaped indented section of the boss section is not well in alignment with the oil hole depending on the sliding position with respect to the boss section of the inner drum, which also makes an orifice structure.

Particularly, when the shift lever is moved from the D range to the N range to release the first clutch, on the basis of the return spring, oil which is forced out from the hydraulic actuator for the first clutch is subjected to the orifice of the oil channel formed in the rear casing and to the orifice of the oil hole formed in the annular indented groove and the inner drum.

Consequently, it sometimes requires a long time to release the first clutch from the N range shift of the shift lever. Consequently, after the N range shift, a driving force is continuously transmitted for a while, so that the creep running is continued long against the driver's intension. Further, when the shift to the N range is erroneously made during driving, the driving force is transmitted for a while, which causes a misunderstanding that the D range driving is still being continued followed by the sudden loss of driving.

SUMMARY OF THE INVENTION

The object of the present invention is to provide an oil channel structure for the automatic transmission in which the oil channel formed in the casing does not compose an orifice thereby overcoming the problems as mentioned above.

The oil channel structure for the automatic transmission of the present invention is made taking into consideration the abovementioned situation and is characterized by an oil channel structure in an automatic transmission comprising a clutch (C1) for connecting an input shaft (1) to a rotating element (R1) in a planetary gear unit (2), and a hydraulic actuator (3) for activating the clutch to which oil is supplied through an oil channel formed in a casing (5), the improvement comprising a plurality of oil channels (7, 9) communicated with the hydraulic actuator (3) and radially arranged in a single plane with reference to an axial direction of the casing (5).

In an example, the casing is a rear cover (5) secured to a rear surface of a transaxle casing (6), the clutch is a first (forward) clutch (C1) positioned in the rear cover, the hydraulic actuator (3) has a cylinder comprising an inner drum (1a) which slides on a boss section (5a) formed on the rear cover (5) and an outer drum (10) secured to the inner drum, and the oil channels (7, 9) are communicated with the hydraulic actuator (3) through an oil hole (a) formed in the inner drum (1a).

In the structure mentioned above, oil is supplied to the hydraulic actuator (3) during forward running with the first clutch (C1) being in connection. Then, for example, if the shift lever is moved from the D range to the N range to release the hydraulic pressure, the oil in the hydraulic actuator (3) is instantly exhausted through the oil hole (a), the annular indented groove (b) of the boss section (5a), and the sector-shaped (arcuate-shaped) indented section (7b, 9b) and the oil channels (7, 9).

Incidentally, the reference numerals in the parentheses are used only for reference with the drawings and do not limit the structure of the invention. The same number may be used differently in the following description and in the previous description in which broader concepts are adopted.

DETAILED DESCRIPTION OF THE PREFERRED EMBODIMENTS

An embodiment of the present invention will now be described with reference to the drawings.

Figure 4:
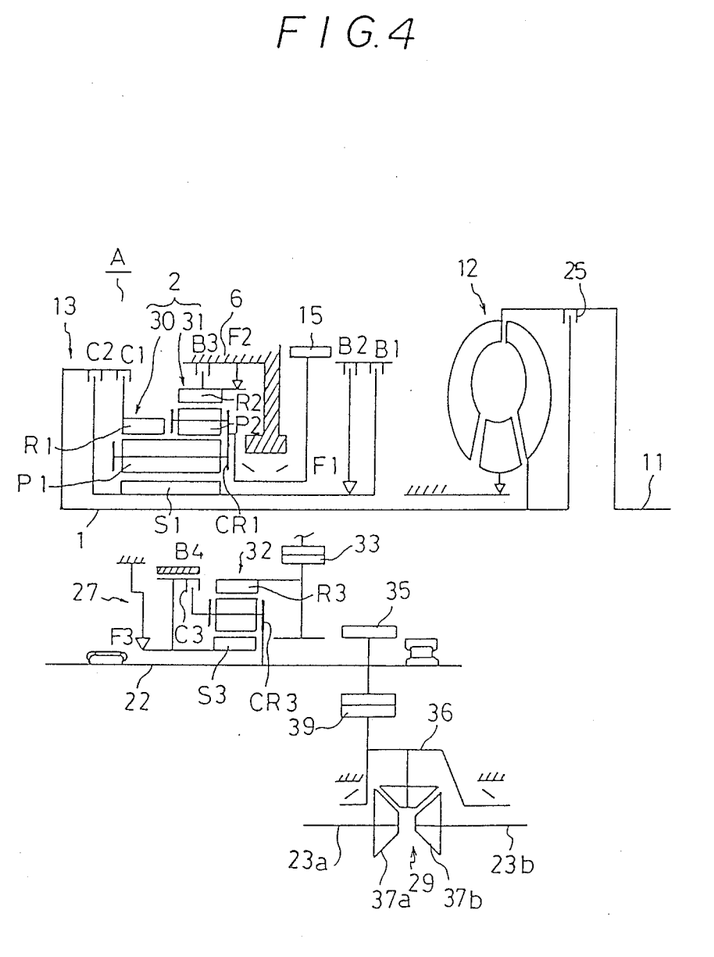
FIG. 4 is a schematic view of an automatic transmission to which the present invention is applied.

Now referring to FIG. 4, an automatic transmission A applicable to the present invention comprises three shafts, that is an input shaft 1 aligned with an engine crank shaft 11, a counter shaft 22, and front axle shafts 23a, 23b. A first automatic transmission mechanism section 13 and a torque converter 12 with a lockup clutch 25 are supported on the input shaft 1, and a second automatic transmission mechanism section 27 is supported on the counter shaft 22. A front differential device 29 is supported on the front axle shafts 23a, 23b.

The first automatic transmission mechanism section 13 comprises a planetary gear unit 2 including a single planetary gear 30 and a dual planetary gear 31. In the planetary gear unit 2, the common sun gear S1 of the two planetary gears and the common carrier CR1 are integrally linked, and in addition, a long pinion P1 is engaged with the sun gear S1. The input shaft 1 and a ring gear R1 of the single planetary gear 30 are linked through a first (forward) clutch C1, and the input shaft 1 and the sun gear S1 are linked through a second (reverse and direct) clutch C2. The sun gear S1 is directly engaged with and stopped by the first brake B1, and prevented from rotating in one direction by means of the second brake B2 through a first one-way clutch F1. A ring gear R2 of the dual planetary gear 31 is directly engaged with and stopped by a third brake B3, and prevented from rotating in one direction by a second one-way clutch F2. The carrier CR1 is connected to the counter drive gear 15 supported by a casing bulkhead. The gear 5 is an output member of the automatic transmission mechanism section 13.

The second automatic transmission mechanism section 27 has a single planetary gear 32. The sun gear S3 and a carrier CR3 of the planetary gear 32 are linked to each other through a third (direct) clutch C3. In addition, the sun gear S3 is directly engaged with and stopped by a fourth (under-drive) brake B4, and is prevented from rotating in one direction by means of a one-way clutch F3. The ring gear R3 engages the counter drive gear 5 and is linked to a counter-driven gear 33 which is the input member of the automatic transmission mechanism section 27. The carrier CR3 is linked to the counter shaft 22. A reducing gear 35 which is the output member of the automatic transmission mechanism section 27 is secured to the counter shaft 22.

The front differential device 29 comprises a differential carrier 36 and a pair of left and right sun gears 37a, 37b. A ring gear 39 is secured to a gear mounting casing which forms the differential carrier 36. The ring gear 39 engages the reducing gear 35 to complete the configuration of the speed reducing mechanism. The left and right gears 37a, 37b are linked to the left and right front axle shafts 23a, 23b respectively.

Figure 5:
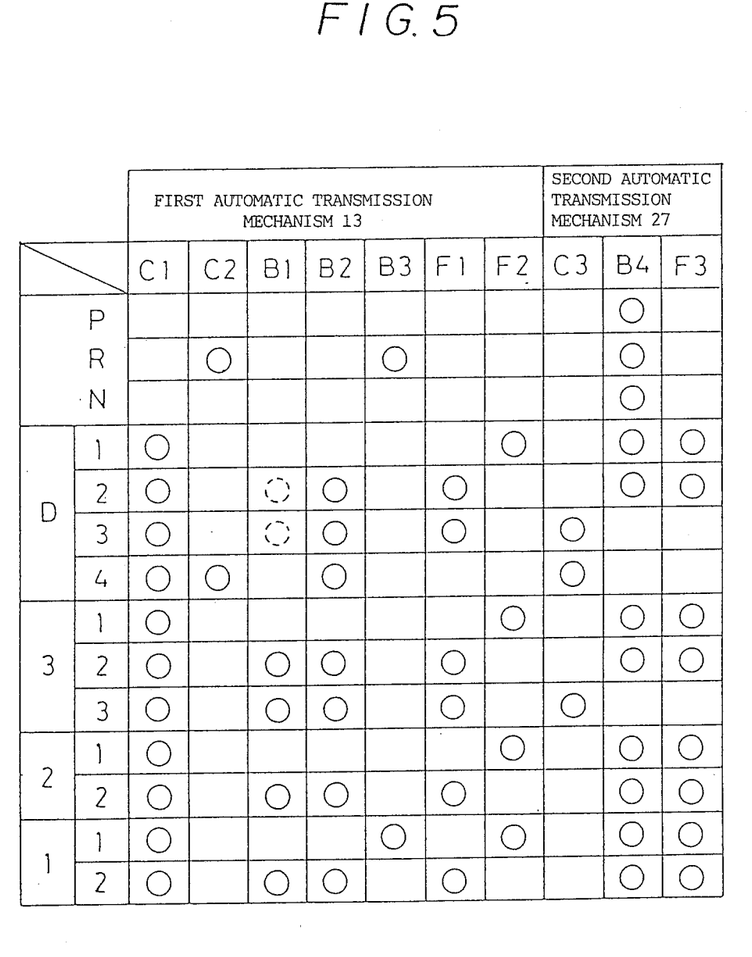
FIG. 5 is an illustration showing the operation of the automatic transmission of FIG. 4.

The operation of the automatic transmission A will now be explained with reference to FIG. 5.

The rotation of the engine crank shaft 11 is transmitted to the input shaft 1 through the torque converter 12 or the lockup clutch 25. In the first speed status in the D range, the first clutch C1 is placed in an engaged state, and the fourth brake B4 is in a stopped state. In this status, in the first automatic transmission mechanism section 13, the rotation of the input shaft 1 is transmitted to the ring gear R1 of the single planetary gear 30 through the first clutch C1, and the ring gear R2 of the dual planetary gear 31 is prevented from rotating by the second one-way clutch F2, so that while the sun gear S1 is idling in the reverse direction, the common carrier gear CR1 is caused to rotate at a greatly reduced speed in the forward direction, and rotation is produced through the counter drive gear 5. In the second automatic transmission mechanism section 27, the sun gear S3 is stopped by means of the fourth brake B4 and the third one-way clutch F3, so that the rotation from the counterdriven gear 33 is produced as a reduced speed rotation in the carrier CR3 from the ring gear R3. Accordingly, the first speed rotation of the first automatic transmission mechanism section 13 and the reduced speed rotation of the second automatic transmission mechanism section 27 are combined, and the rotation is transmitted to the front differential device 29 through the reducing gear 35 and the ring gear 39, and is then transmitted to the left and right front axle shafts 23a, 23b.

In the second speed status in the D range, the second brake B2 is activated in addition to the connection of the first clutch C1 and the action of the fourth brake B4. Whereupon the rotation of the sun gear S1 is halted from the action of the first one-way clutch F1 based on the brake B2. Accordingly, with respect to the rotation of the first ring gear R1 through the input shaft 1, while the ring gear R2 of the dual planetary gear 31 is being idled in the forward direction, the carrier CR1 rotates with reduced speed in the forward direction, and the rotation is produced as the second speed in the counter drive gear 15. The second automatic transmission mechanism section 27 remains unchanged at reduced speed. The second speed of the first automatic transmission mechanism section 13 is combined with the reduced rotation of the second automatic transmission mechanism section 27, and the resulting rotation is transmitted to the front axle shafts 23a, 23b.

In the third speed status in the D range, the first automatic transmission mechanism section 13 maintains the second speed status without change, and when the fourth brake B4 in the second automatic transmission mechanism section 27 is released, the third clutch C3 is placed in engagement. Whereupon the carrier CR3 and the side gear S3 become connected to each other, and the planetary gear 32 rotates in an integral manner to provide direct rotation in the counter shaft 22. At this time, the fourth brake B4 is released a little before the engagement of the third clutch C3, and shifting is made by the third one-way clutch F3 preventing transmission from becoming impossible. Accordingly, the second speed rotation of the first automatic transmission mechanism section 13 and the direct rotation of the second automatic transmission mechanism section 27 are combined, and the third speed is obtained as a whole in the automatic transmission A.

When shifting down to the second or third gear in the D range, the first brake B1 is also activated, so that the engine acts as a brake when coasting.

The fourth speed status in the D range is obtained from the third speed status with the second clutch C2 placed in engagement. Whereupon, rotation is transmitted to the ring gear R1 through the first clutch C1 from the input shaft 1, and to the sun gear S1 through the second clutch C2. The planetary gear unit 2 rotates integrally, and rotation is directly transmitted to the counter-drive gear 15. Then, the directly connected rotation of the first automatic transmission mechanism section 13 and the directly connected rotation of the second automatic transmission mechanism section 27 are combined. In addition, the counter-drive gear 15 and the driven gear 33 are in a prescribed acceleration relationship, so that the entire automatic transmission A is subjected to overdrive rotation.

In addition, the third range is the same as the status where the first brake B1 is activated during the application of the second and third speeds in the previously mentioned D range having the first, second and third speeds.

Also, the second range is the same as the first and second speed status in the above third range.

In the first speed status in the first range, in addition to the connection of the first clutch C 1 and the operation of the fourth brake B4, the third brake B3 is operated. In this status, in addition to the stopping by the second one-way clutch, the ring gear R2 is stopped by the third brake B3 regardless the direction of rotation, so that the engine brake is activated. In addition, the second speed status is the same as the second speed status in the second range.

In the reverse range, the second clutch C2 is engaged, and at the same time, the third brake B3 and the fourth brake B4 are activated. In this status, the rotation of the input shaft 1 is transmitted to the sun gear S1 through the second clutch C2. Also in this status, the ring gear R2 of the dual planetary gear 31 is secured by the action of the third brake B3, so that while the ring gear R1 of the single planetary gear 30 is made to rotate, the carrier CR1 is rotated, the carrier CR1 also rotates in reverse, and the reverse rotation of the carrier is produced at the counter drive gear 2. Further, the speed of the reverse rotation of the counter drive gear 15 is reduced by the second automatic transmission mechanism section 27 and is transmitted to the front axle shafts 23a and 23b.

Next, an explanation will be given of the automatic transmission A by means of a specific embodiment with reference to FIG. 6.

The automatic transmission A has an integral casing apparatus comprising a transaxle casing 6, a transaxle housing 41, and a rear cover 5. The input shaft 1, the counter shaft 22, and the ring gear mounting casing 36 which is differential carrier of the front differential device 29 are supported in a freely rotatable manner in the casing apparatus. Then, the torque converter 12 which has a lockup clutch 25, and the first automatic transmission mechanism section 13 are positioned on the input shaft 1. The second automatic transmission mechanism section 27 is positioned on the counter shaft 22. In addition, a valve body 44 is positioned on the transaxle casing 6.

In the first automatic transmission mechanism section 13, a brake section 43, an output section 45, the planetary gear unit 2, and a clutch section 47 are arranged in order in the axial direction from the engine crank shaft 11 to the rear. An oil pump 49 is positioned between the brake 43 and the torque converter 12. A hollow shaft 50 is penetrated and supported in a freely rotating manner by the input shaft 1.

Figure 2:
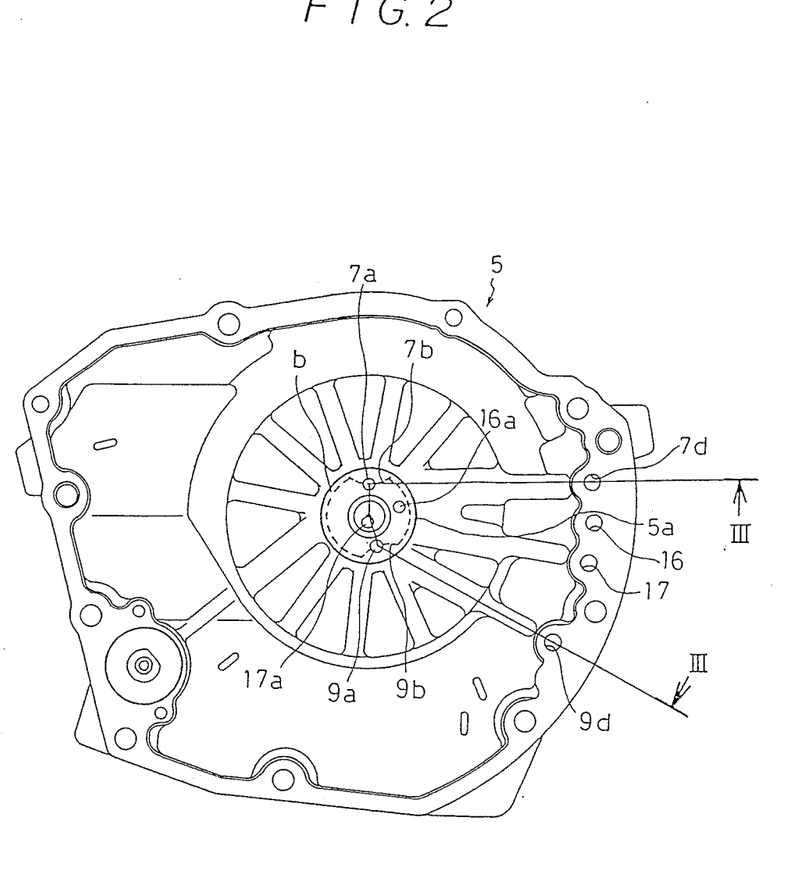
FIG. 2 is a side elevational view showing an inner engagement surface of the rear cover.

The planetary gear unit 2 comprises the single planetary gear 30 and the dual planetary gear 31, as shown in FIG. 2. The single planetary gear 30 comprises the sun gear S1 formed on the hollow shaft 50, the ring gear R1, and the carrier CR1 which supports the pinion P1 which engages the ring gear R1 and the sun gear S1. The dual planetary gear 31 comprises the sun gear S1 formed on the hollow shaft 50, the ring gear R2, and the carrier CR1 which supports the first pinion P1 and the second pinion P2 in a mutually engaging manner, wherein the first pinion P1 is engaged with the sun gear s1, and the second pinion P2 is engaged with the ring gear R2. Both the planetary gears 30, 31 have a common single gear with the same number of teeth that is the sun gear S1 on the hollow shaft 50. The carrier CR is integrally formed and the pinion P1 is formed of an integral long pinion.

In the brake section 43, the first one-way clutch F1, the first brake B1 comprising a multiplate brake and the second brake B2 comprising a multiplate brake are arranged in the brake section 43 in order from the radially inner side in the radially outer direction. In the first one-way clutch F1, the tip of the hollow shaft 50 is engaged through a spline with its inner race, and its hub 1 for the second brake is secured to its outer race. In addition, a hub for the first brake is secured on the front side (engine side) of the inner race of the one-way clutch F1.

The oil pump 49 comprises an oil pump assembly having a pump cover 20 made from an aluminum die casting interposed between pump plates and integrally secured with bolts to the pump body 19. The oil pump 49 is secured to the casing 6 with bolts with the cover 20 inserted into the transaxle casing 6. On the rear side of the oil pump cover 20, the first brake B1 is interposed between a comb-like section of the first flanged section and the hub for the first brake, while the second brake B2 is interposed between a comb-like section of the second flanged section and the hub for the second brake. In addition, on the rear side of the pump cover 20, a cylinder for the hydraulic actuator 60 for the first brake is constructed, and a cylinder for the hydraulic actuator 62 for the second brake is constructed. A piston is in a oil-tight manner fitted to the cylinders, so that the first brake B1 and the second brake B2 can be operated.

The torque converter 12 is provided with a converter housing 91 linked to the engine crank shaft 11 (FIG. 2), and further with a pump impeller 92 and a lockup clutch 25 connected to the housing 91, a turbine impeller 93 connected to the input shaft 1, and a stator 94 positioned between the two impellers 92, 93. The converter housing 91 is secured at its tip to the pump sleeve 49a, which extends through the pump body 19 and is secured at its tip to a pump drive gear. The stator 94 is secured to an outer race of the one-way clutch 95. In addition, an inner race of the one-way clutch 95 is engaged through a spline to the stator shaft 96. The stator shaft 96 is a hollow shaft fabricated from steel. The pump sleeve 49a is positioned on the outer circumference side of the stator shaft 96, and the input shaft 1 is positioned on the inner circumference side to form a relatively freely rotatable triple shaft. One end of the stator shaft 96 forms a spline engagement with the inner race of the one-way clutch 95. The other end of the stator shaft 96 is secured by being pressed into the center hole section of the pump cover 20.

The output section 45 has a counter drive gear 15 positioned at almost dead center of the first automatic transmission mechanism section 13. The counter drive gear 15 is supported in a freely rotatable manner on the bulkhead 6c formed in the transaxle casing 6 through a double tapered bearing 45a. The counter drive gear 15 has a boss section which is connected to the carrier CR1 of the planetary gear unit 2. An outer race of the bearing 45a is engaged by a spline to the inner peripheral surface of the casing bulkhead 6c, and the second one-way clutch F2 is mounted on the outer peripheral surface of a race extension section.

An outer race of the second one-way clutch F2 is secured to the ring gear R2 of the dual planetary gear 31, and the ring gear R2 is supported in the axial direction by a support plate which is interposed between a counter gear boss section and the carrier CR1 through a thrust bearing. Accordingly, the second one-way gear F2 is juxtaposed in the axial direction between the planetary gear unit 3 and the casing bulkhead 6c. In addition, the third brake B3 is interposed between the outer periphery of the ring gear R2 and the axle casing 6, and a cylinder is formed on one side of the surface section of the bulkhead 6c. In addition, the hydraulic actuator 65 formed of a piston is positioned between the one-way clutch F2 and the cylinder. Further, the hydraulic actuator 65 is provided with a cylindrical, comb-tooth shaped arm. This arm extends in the axial direction through the radially outer side of the second one-way clutch F2, so that a return spring is arranged in the combtooth section and the third brake B3 is controlled.

Figure 1:
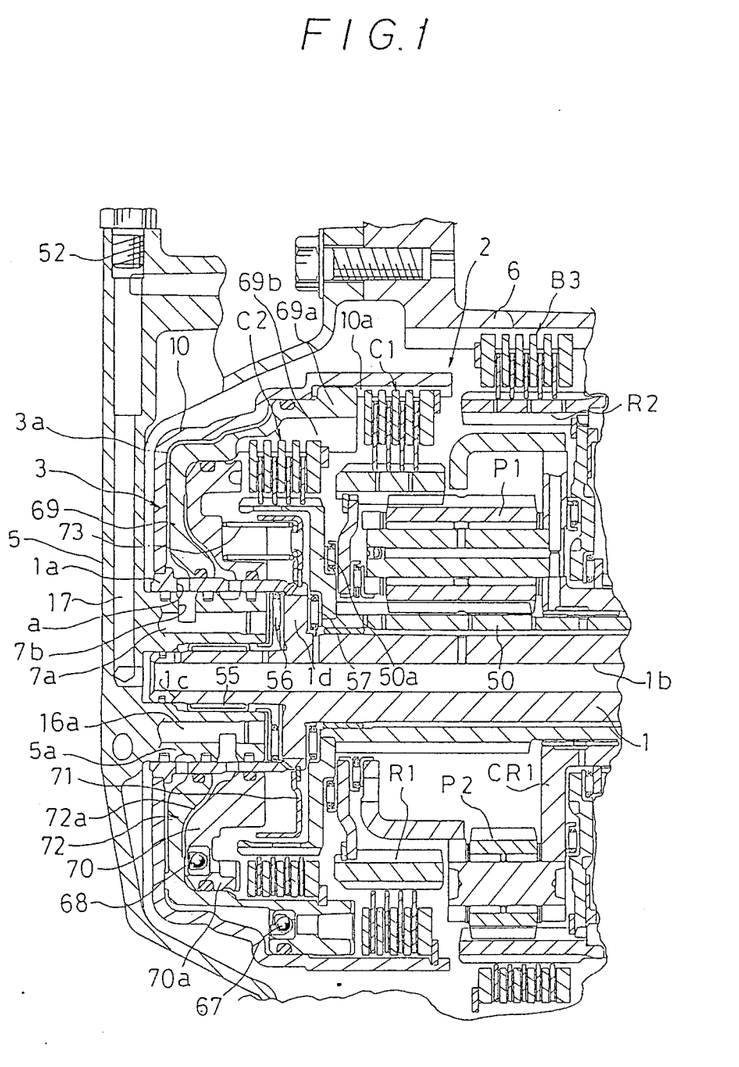
FIG. 1 is a cross-sectional view showing an oil channel structure and clutch section of the present invention.

The clutch section 47 is provided with the first (forward) clutch C1 and the second (direct) clutch C2 and is positioned at the rear edge of the first automatic transmission mechanism section 13 and housed in the rear cover 5. In addition, the rear edge section of the input shaft 1 is connected to the inner drum 1a to be engaged with the boss section 5a of the cover 5. And, the outer drum is integrally connected at the tip of the inner drum, and has a bottomed cylindrical shape.

In the inner tip peripheral surface of the outer drum 10, the spline 10a is formed, and a cylinder is formed by the stepped inner peripheral surface and the outer peripheral surface of the inner drum 1a. The first movable member 69 is oil-tightly fitted onto a sliding surface of the cylinder, and extends axially to have a lug 69a adjacent to the first clutch C1. Accordingly, a hydraulic actuator 3 for operation of the first clutch having an oil channel 3a is defined by the inner drum 1a, outer drum 10 and the movable member 69. On the outer peripheral surface of the lug 69a, a spline is formed to engage the spline 10a. Also, a check valve 67 is provided to release the centrifugal hydraulic pressure at suitable portions. On the inner peripheral surface of the axially disposed tip end of the first movable member 69, a spline 69b is formed, and it forms a cylinder together with the axially disposed inner peripheral surface and the inner drum 1a. Oil-tightly fitted onto the sliding surface of the cylinder is a second movable member 70 which has an outer peripheral edge 70a extending axially adjacent to the second clutch C2, and a check valve 68 to release the centrifugal hydraulic pressure. Accordingly, with the cylinder comprising the first movable member 69 and the inner drum 1a and the piston comprising the second movable ember 70, a hydraulic actuator 72 having an oil channel 72a is formed to operate the second clutch. In addition, between the second movable member 70 and the receiving member 71 secured with the snap ring mounted to inner drum 1a, a spring 73 is provided in compression, and forms a return spring common to the piston members 69, 70 of the hydraulic actuator 3, 72. The second clutch C2 is positioned between the spline 69b formed in the inner peripheral surface of the outer diameter section of the first movable member 69 and the spline formed on the outer periphery of the hub 50a secured to the hollow shaft 50.

Figure 3:
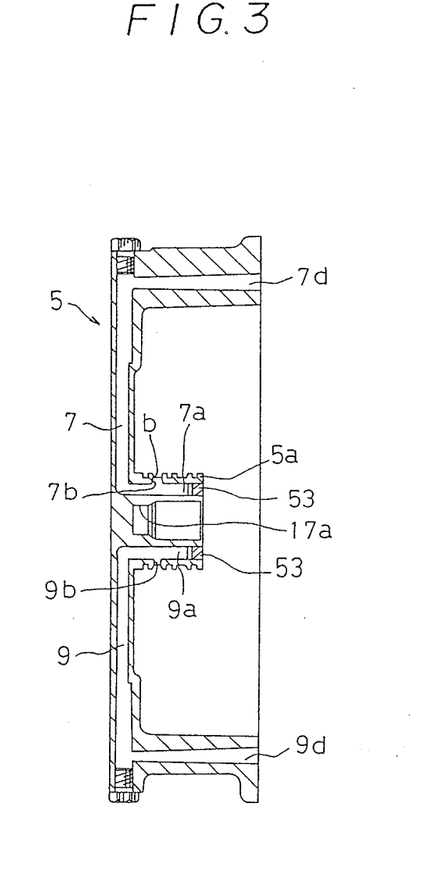
FIG. 3 is a cross-sectional view taken along the line of III—III.

The rear cover 5 has a boss section 5a of a ring shape inwardly extending as shown in FIG. 2 and FIG. 3. Further, first, second, third, and fourth oil channels 7, 9, 16, 17 extend outwardly and radially from boss section 5a in a single plane with the outer end of the oil channels blocked by a plug. Only a plug of the oil channel 17 is shown in FIG. 1. The first and second oil channels 7, 9 are communicated with the oil hole of the transaxle casing 6 through the lateral holes 7d, 9d formed in the cover 5 at the peripheral portion, and with a certain valve or valve body 44 at an oil hole in the casing 6. Similarly, the third oil channel 16 is communicated with a valve in the valve body, and the fourth oil channel 17 is communicated with a lubricant source. The inner side of the first and second oil channels 7, 9 are communicated with oil holes 7a, 9a axially formed and separated from each other by an angle of about 180°. The ends of the oil holes are blocked by the plugs 53, 53. Indented portions 7b, 9b of a sector (arcuate) shape are formed around the oil holes 7a, 9a, which are communicated with the annular indented groove b on the same plane in the axial direction through the indented portions 7b, 9b. Formed on the plane in alignment with the annular indented groove b in the inner drum 1a are a plurality of oil holes a, through which oil in the valve body 44 communicates with the oil channel 3a of the hydraulic actuator 3 for operation of the first clutch C1. The third oil channel 16 is communicated with the oil chamber 72a of the hydraulic actuator 72 for operation of the second clutch C2 through the indented portion of the sector shape and the lateral hole 16a.

Incidentally, the tip end 1c of the input shaft 1 has a small diameter to form a thin section 1c, which is supported by the inner hole of the boss section 5a through a needle bearing 55. A radially expanded flange section 1d is formed adjacent to the thin section 1c. A thrust bearing 56 is interposed between the lange section 1d and the end face of the boss section 5a. A thrust bearing 57 is interposed between the opposite end face of the flange section 1d and a stepped portion of the hub 50a secured to the hollow shaft 50 to bear the thrust force acting on the input shaft 1 and the intermediate shaft 50.

Figure 6:
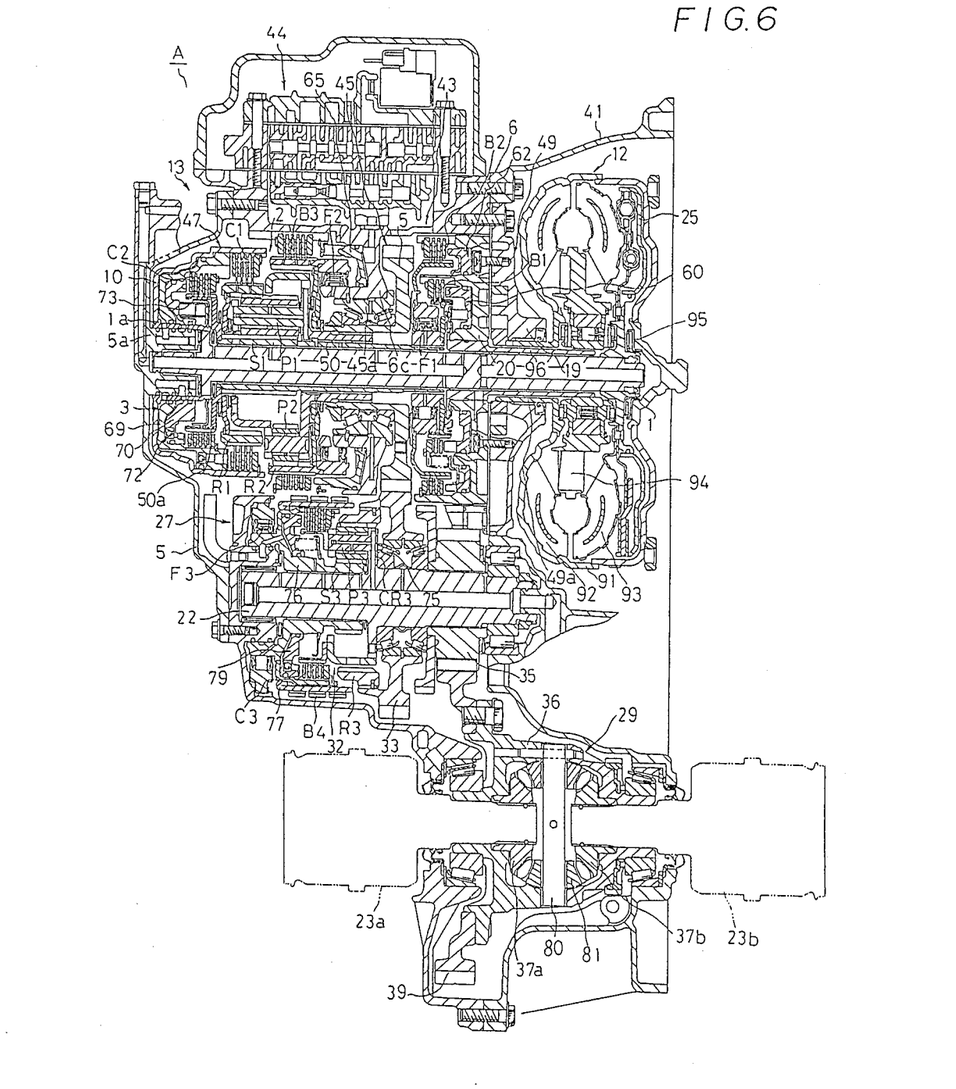
FIG. 6 is a cross-sectional view generally showing the automatic transmission of FIG. 4.

The second automatic transmission mechanism section 27 is provided with one single planetary gear 32 as shown in FIG. 6. Also, the counter driven gear 33 is supported in a freely rotatable manner on the counter shaft 22 through a bearing 75, and the reducing gear 35 is secured to the counter shaft 22. The ring gear R3 of the planetary gear 32 is linked to the counterdriven gear 33. The carrier CR3 which supports the pinion P3 is integrally formed by expansion in the radially outer direction of the counter shaft 22. The sun gear S3 is formed on a hub 76 which is supported in a freely rotatable manner on the shaft 22. A drum 77 secured to the radially outer section of the hub is engaged on its outer peripheral surface by the fourth brake B4 which is a hand brake. The third clutch C3 is interposed between the inner peripheral surface of the drum 77 and the hub secured to the carrier CR3. A piston engages the hub 76 adjacent to the clutch C3 and forms a hydraulic actuator 79 for the clutch C3. The third one-way clutch F3 is interposed between the elongated section of the hub 76 and the casing 6.

The front differential device 29 is provided with the ring gear mounting casing 36 which forms a differential carrier. The casing 36 is supported in freely rotatable manner on the housing 41 and casing 6 through a bearing. The large diameter ring gear 39 which engages the reducing gear 35 is secured to the mounting casing 36. In its inner section, a pinion gear 81 is supported in a freely rotatable manner by a pinion shaft 80, and the right and left side gears 37a, 37b which engage the gear 81 are supported in a freely rotatable manner. A pair of right and left front axle shafts 23a, 23b are respectively engaged and linked by the side gears 37a, 37b.

Next, the action of the automatic transmission A will be explained.

The rotation of the engine crank shaft 11 is transmitted to the input shaft 1 of the torque converter 12 or the lockup clutch 25.

In the first speed status of the automatic transmission A, a prescribed oil pressure is supplied to the oil chamber 3a of the hydraulic actuator 3, the outer and inner drums 1a, 10 act as a cylinder to move the movable member 69 against the spring 73, so that the first clutch C1 is engaged, and the fourth brake B4 is activated. In this status, the rotation of the input shaft 1 is transmitted to the first clutch C1 through the outer and inner drums 1a, 10, and is transmitted to the ring gear R1 of the single planetary gear. Further, in this status, the ring gear R2 of the dual planetary gear is prevented from rotating by the second one-way clutch F2, so that while the sun gear S1, that is the hollow shaft 50 is caused to idle, the rotational speed of the carrier CR1 is reduced, and this rotation is taken from the counter drive gear 15. Then, the rotation is transmitted to the ring gear R3 of the second automatic transmission mechanism section 27 through the driven gear 33 which engages the counter drive gear 15. Through a stoppage of the sun gear S3 by means of the fourth brake B4 and the third one-way clutch F3, reduced speed rotation is produced from the carrier CR3, and this rotation is transmitted to the left and right front axle shafts 23a, 23b from the front differential device 29 through the reduction gear 35 and the ring gear 39.

When shifting up from the first speed to the second speed, while in the above mentioned first speed status, oil pressure is supplied to the oil chamber of the hydraulic actuator 62, the piston is extended, and the second brake B2 is engaged. When this occurs, the rotation of the sun gear S1, that is the hollow shaft 50 is prevented by the first one-way clutch F1. In this status, the rotation which is transmitted from the input shaft 1 through the clutch C1 to the ring gear R1 is transmitted as reduced speed rotation to the carrier CR1 while the ring gear R2 is idling. The reduced speed rotation is taken out from the counter drive gear 15, reduced by means of the second automatic transmission mechanism section 27, and transmitted to the front differential device 29. In addition, when a downshift is made from the fourth or third speed to the second speed, oil pressure is also applied to the oil chamber of the hydraulic actuator 60, and the piston is extended to stop the first brake B1. As a result, the second brake B2 cannot function as a result of the idling of the one-way clutch F1 and the first brake B1 directly engages the sun gear S1 and the braking effect of the engine is activated.

In addition, in the third speed status, the first automatic transmission mechanism section 13 remains in the second speed status. In the second automatic transmission mechanism section 27 the fourth brake B4 is released and oil pressure is activated in a hydraulic actuator 79 and applied to the third clutch C3. As a result, the planetary gear 32 becomes directly coupled, and the rotation is transmitted to the front differential device 29.

When shifting up from the third speed to the fourth speed, oil pressure is applied to the hydraulic actuator 72 and this pressure is applied to the second clutch C2. As a result, the rotation from the input shaft 1 is transmitted to both the ring gears R1, R2 through the first and second clutches C1, C2, the planetary gear unit 2 integrally rotates, and the rotation is transmitted directly to the front differential device 29 through the direct rotation of the second automatic transmission mechanism section 27.

In addition, in the reverse range, oil pressure is applied to the hydraulic actuators 72 and 65, and both of the second clutch C2 and the third clutch C3 are also placed in engagement. In this status the rotation of the input gear 3 is transmitted to the sun gear S1 through the second clutch C2, and, based on the halt of the ring gear R2, reverse rotation is produced from the carrier CR1 and this reverse rotation is transmitted to the front differential device 29 through the reduced speed rotation of the second automatic transmission mechanism section 27.

By shifting the shift lever from the D range (or 3, 2, 1 range) to the N range (or R range), the hydraulic pressure to the hydraulic actuator 3 for operation of the first clutch C1 is released. Then, oil in the oil chamber 3a is instantly exhausted through the oiling hole a of the inner drum 1a, the annular indented section b of the boss section 5a, two indented portions of sector shape 7b, 9b, the oiling holes 7a, 9a, the oil channels 7, 9 and the lateral holes 7d, 9d, so that the forward driving is instantly produced.

In the abovementioned embodiment of the present invention, the explanation was given to the automatic transmission A comprising the first automatic transmission mechanism section 13 with the forward third speed and the second automatic transmission mechanism section 27 with the direct speed and reduced speed switching. However, this is not restrictive to the present invention. As revealed in Japanese Laid Open Patent No. SHO-62-141342, an automatic transmission using four forward speeds of an automatic transmission mechanism section, or other automatic transmissions can, of course, be applied.

TECHNICAL ADVANTAGES OF THE INVENTION

As mentioned above, in the present invention, the hydraulic actuator (3) for operation of the clutch (C1) is communicated with a plurality of oil channels (7, 9), so that when releasing the hydraulic pressure in the hydraulic actuator (3) it is instantly drained, whereby the dragging torque of the clutch (C1) disappears. In addition, the plurality of oil channels (7, 9) are provided in a single plane in an axial direction of the casing (5), so that there is no need to form a special space for the oil channels, resulting in an axially and radially compact structure.

When the clutch is the first (forward) clutch (C1), the vehicle can be instantly and securely stopped when shifting from the D range or other forward ranges to the N range.

In addition, since the oil channels (7, 9) are formed in the rear cover (5), a plurality of oil channels are easily formed in a single plane, so that the oil channel structure is formed in a simple and precise manner together with the oil channel (16) to the other hydraulic actuator (72) and the lubricant oil channel (17).

What is claimed is:

1. An oil channel structure in an automatic transmission, comprising:

a casing having a boss section, a valve body attached to the casing, a hydraulic actuator adapted to operate a clutch of the automatic transmission, said hydraulic actuator including a cylinder slidably situated on said boss section, and a movable member retained in the cylinder to constitute an oil chamber therebetween, and means for communicating between said hydraulic actuator and said valve body, said communicating means including a plurality of oil channels extending outwardly from said boss section and radially thereof in a single plane to supply oil from said valve body to said hydraulic actuator through said oil channels so that oil is smoothly supplied to and exhausted from the hydraulic actuator through the oil channels.

2. An oil channel structure according to claim 1, wherein said casing comprises a transaxle casing on which the valve body is disposed, and a rear cover fixed to the transaxle casing, and said communicating means further includes a plurality of lateral holes formed in the rear cover to respectively communicate the oil channels with the valve body on said transaxle casing.

3. An oil channel structure according to claim 2, wherein said oil channels are formed in the rear cover.

4. An oil channel structure according to claim 1, wherein said communicating means further comprises:

a plurality of axially extending oil holes formed in the boss section, said axially extending oil holes communicating the oil channels, respectively, an annular indented groove formed in said boss section to communicate with said axially extending oil holes, and at least one oil hole formed in the cylinder to communicate the annular indented groove with the hydraulic actuator so that oil is smoothly supplied to and exhausted from the hydraulic actuator.

5. An oil channel structure according to claim 4, wherein said axially extending oil holes comprise two oil holes arranged substantially opposite to each other relative to a center of the boss section.

* * * * *